(12) United States Patent
Thompson et al.

(10) Patent No.: US 6,343,661 B1
(45) Date of Patent: Feb. 5, 2002

(54) SUSPENSION SYSTEM FOR A WORK VEHICLE

(75) Inventors: Dennis G. Thompson, Saskatoon; Dennis W. Chahley, Martensville, both of (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/615,969

(22) Filed: Jul. 14, 2000

(30) Foreign Application Priority Data

Jul. 16, 1999 (CA) .............................................. 2278073

(51) Int. Cl.[7] .............................................. A01C 3/06
(52) U.S. Cl. ...................................... 172/444; 239/159
(58) Field of Search .............................. 239/159, 160, 239/164, 166, 172, 176; 267/276, 280; 248/609, 654; 172/439, 311, 444, 310

(56) References Cited

U.S. PATENT DOCUMENTS

| | | | |
|---|---|---|---|
| 2,712,742 A | * | 7/1955 | Neidhart ..................... 239/162 |
| 3,436,069 A | * | 4/1969 | Henschen ................... 267/57.1 |
| 4,197,999 A | * | 4/1980 | Lammers .................... 239/166 |
| 5,375,767 A | * | 12/1994 | Thorstensson .............. 239/164 |
| 5,411,287 A | * | 5/1995 | Henschen ................... 280/717 |
| 5,794,852 A | * | 8/1998 | Wald et al. ................. 239/167 |
| 5,957,383 A | * | 9/1999 | Benest ........................ 239/166 |
| 6,047,901 A | * | 4/2000 | Pederson et al. ........... 239/159 |

* cited by examiner

Primary Examiner—Robert E. Pezzuto
(74) Attorney, Agent, or Firm—Larry W. Miller; John William Stader

(57) ABSTRACT

A suspension system supports an implement on a work vehicle and includes a linkage mechanism providing pivotal connection between the work vehicle and the implement and adapted to pivot in such manner as to permit relative upward and downward movement between the vehicle and the implement while maintaining a controlled or selected orientation between them. A hydraulic actuator capable of extending and retracting is operatively connected between the work vehicle and the implement so as to effect the pivotal motion of the linkage and relative motion between the vehicle and implement. A shock absorber is interposed between the hydraulic actuator and one of the work vehicle and the implement for absorbing shock loadings tending to pass between the vehicle and the implement via the hydraulic actuator when in use. The shock absorber includes an elongated link mounted for pivotal motion at a point between opposing ends thereof. One end portion of the elongated link is connected to an end of the actuator and the other end of the link is in a load transmitting relation to a resilient cushion whereby forces exerted by or on the actuator tend to effect pivotal motion of the elongated link and are transformed into compression forces on the resilient cushion.

22 Claims, 5 Drawing Sheets

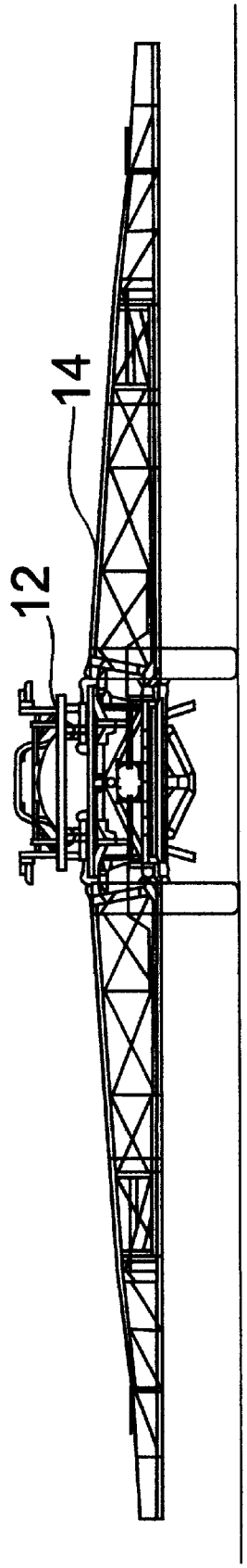
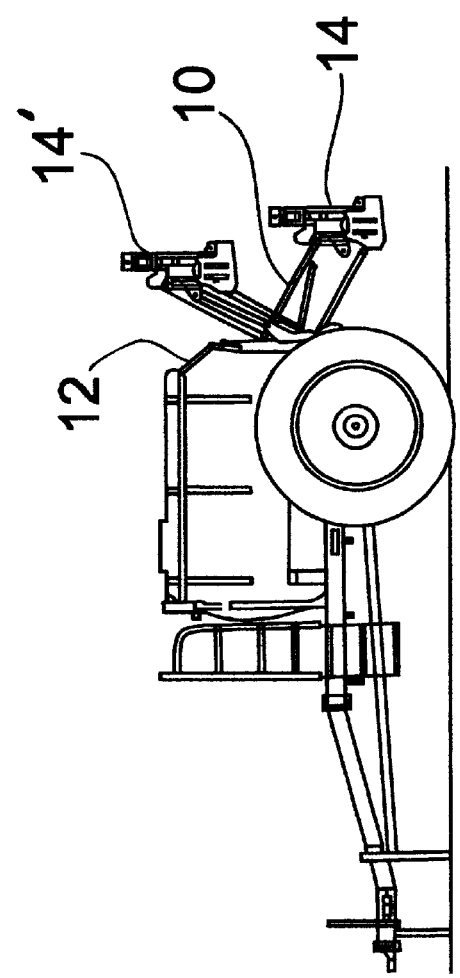

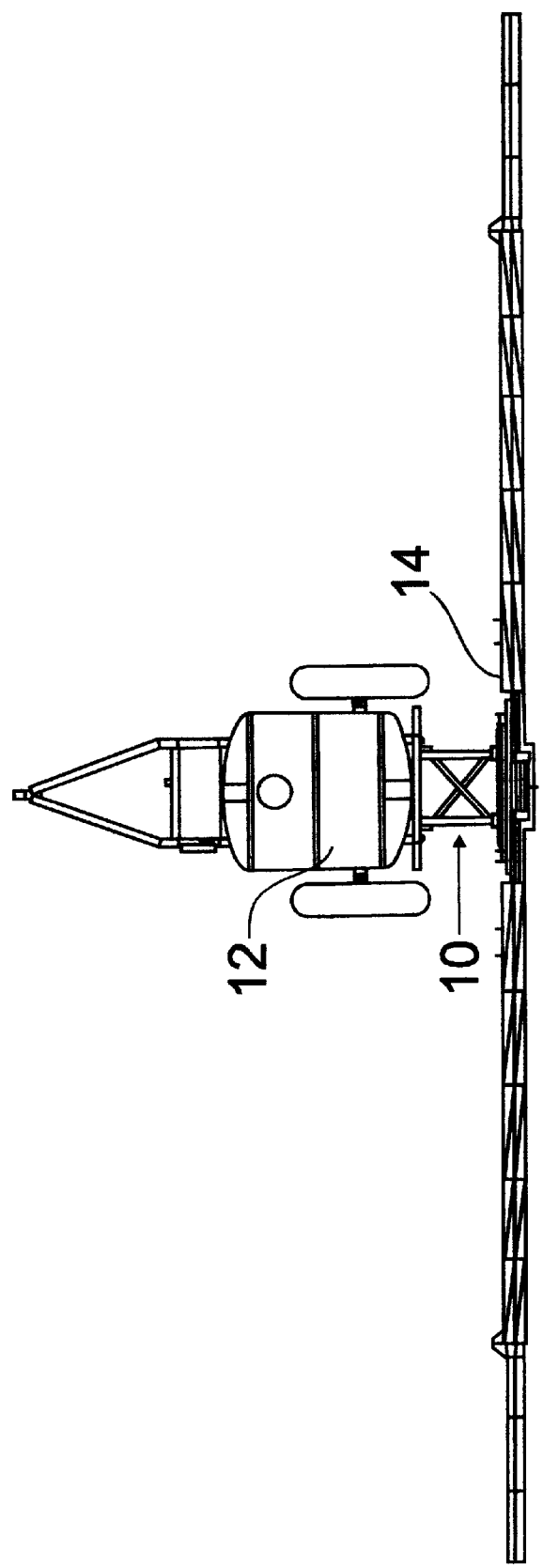

SUSPENSION SYSTEM FOR A WORK VEHICLE

FIELD OF THE INVENTION

This invention relates to a shock reducing suspension used with agricultural work vehicles for connecting an implement such as a sprayer boom assembly to the work vehicle.

BACKGROUND OF THE INVENTION

Agricultural work vehicles such as sprayers and wind rowers typically comprise a work vehicle supported on wheels and to which is connected a working implement with provision for raising and lowering the implement relative to the ground and to the work vehicle. Typically this provision comprises generally parallel arm linkages which maintain the orientation of the implement relative to the work vehicle as it raised or lowered. Particular implements for use with a work vehicle may be a wind rower header or a sprayer boom assembly. These implements may have additional supports such as wheels to guide the height of the assembly above the ground or to make intermittent contact with the ground to prevent other components of the implement from contacting the ground, or they may have none at all. The implement may be fully suspended by the work vehicle. Hydraulic actuators are typically used for raising or lowering the implement. The actuators may be connected between the parallel arms, or between one of the parallel arms and either the work vehicle or the implement, or between the work vehicle and the implement.

The work vehicle may of the type adapted to be pulled by a pulling vehicle or may be self-propelled. The ground across which the work vehicle moves may be uneven, subjecting the work vehicle to sudden vertical components of movement. Sudden changes in movement of the work vehicle are transmitted to the implement through the parallel arm connection and result in shock forces between the work vehicle and implement through the parallel arm connection.

In an effort to reduce work time and increase efficiency, implements such as sprayer booms are generally being made longer to cover a wider area of ground in a single pass. As the boom length increases, so does the mass of the implement, and the resultant shock forces increase in proportion to that mass. Uncontrolled movement of the implement can also result in undesirable variations in the work being performed, for example, variations in spray pattern on a field from liquid spray nozzles mounted across a spray boom.

Prior attempts have been made to reduce the shock forces that result from sudden changes in movement such as those shown in U.S. Pat. Nos. 5,375,767 and 4,197,999. These patents show spray boom assemblies with parallel arm connections to a work vehicle in which springs and dampers are used to allow controlled movement between the work vehicle and implement and to reduce acceleration of the implement and minimize shock forces. However, these designs do not have convenient means to adjust the height of the spray boom relative to the work vehicle or relative to the ground.

Other known prior art designs known have hydraulic actuators used to control movement between a work vehicle and an implement connected to it by parallel arms. Some of these include hydraulic accumulators in the circuit in which the actuators are connected so that increased forces are absorbed by the accumulator.

Another prior design is used on machines made by Redball in which a hydraulic actuator is used to control movement between a work vehicle and spray boom connected to the work vehicle by parallel arms. In this design a suspension device is mounted to the work vehicle comprising of a rockshaft supported at both ends to the vehicle by torsional elastic joints as are disclosed in patents of Neidhart U.S. Pat. No. 2,712,742 or Henschen U.S. Pat. No. 5,411,287 and U.S. Pat. No. 3,436,069. An arm extends from the rockshaft and one end of the hydraulic actuator is connected to an end of the arm offset from the rotational axis of the rockshaft. The other end of the actuator is connected to the spray boom implement or to a parallel arm near one end, which is connected to the spray boom implement. Force from sudden changes to vertical movement of the implement act through the hydraulic actuator and arm to be absorbed by the elastic joints through rotation of the rockshaft.

It is desirable to provide a suspension system for agricultural work vehicle implements that allows for adjustment of the height of the implement, is effective at such various heights to reduce shock forces from sudden changes in vertical movement of the implement, and which is comparatively less expensive and less complicated than that of the prior art. It is desirable that such suspension system be easily incorporated into the boom lift linkage which supports the implement on the work vehicle.

SUMMARY OF THE INVENTION

A suspension system for supporting an implement on a work vehicle, in accordance with one aspect of the invention includes: a linkage mechanism adapted for pivotal connection between the work vehicle and the implement and adapted to pivot in such manner as to permit relative upward and downward movement between the vehicle and the implement while maintaining a controlled or selected orientation between them; a hydraulic actuator capable of extending and retracting and adapted to interact between the work vehicle and the implement when in use so as to effect the pivotal motion of said linkage and relative motion between the vehicle and implement in at least one direction; and a shock absorber adapted to be interposed between said hydraulic actuator and one of the work vehicle and the implement for absorbing shock loadings tending to pass between the vehicle and the implement via said hydraulic actuator when in use and regardless of the degree of extension or retraction of said actuator.

In another aspect the invention provides the combination of an agricultural work vehicle, an implement and a suspension system as recited above.

The shock absorber preferably includes a resilient cushion to absorb the shock loadings tending to be transmitted via said actuator.

The shock absorber also preferably includes an elongated link mounted for pivotal motion at a point between opposing ends thereof, one end portion of said elongated link being connected to an end of said actuator and the other end of said link being in a load transmitting relation to said resilient cushion whereby forces exerted by or on said actuator tend to effect pivotal motion of said elongated link and are transformed into compression forces on said resilient cushion.

The linkage mechanism preferably comprises upper and lower arm assemblies both of which have joints at their opposing ends to allow for pivotal connection thereof between the work vehicle and the implement. The elongated link of the shock absorber is also preferably mounted for said pivotal motion at a point which is co-axial with the joints at one end of one of said arm assemblies.

The suspension system advantageously includes mounting bracket securable to one of said implement and work vehicle and co-operating with the joints at said one end of said one of said arm assemblies to define a pivot axis therewith co-axial with the pivot axis of said elongated link. The mounting brackets preferably further define bearing surfaces with each said resilient cushion being interposed between a respective one of the bearing surfaces and a respective said other end of an associated said elongated link.

A further resilient cushion may be associated with another one of said bearing surfaces and said elongated link such that said shock absorber is capable of absorbing both compressive and tensile shock loadings passing through said hydraulic actuator. Each said resilient cushion is preferably of a resilient polyurethane material.

In a preferred form, said hydraulic actuator is connected in use between one of said arm assemblies and said one end portion of said elongated link of the shock absorber. The upper and lower arm assemblies may also be of equal length so as to form a parallel arm linkage system, said hydraulic actuator having one end thereof connected adjacent to an end portion of one of said arm assemblies while the other end of said actuator is connected to said one end portion of said elongated link.

These and other aspects of the invention will be accomplished by the instant invention by providing a suspension system for supporting an implement on a work vehicle. The suspension system includes a linkage mechanism providing pivotal connection between the work vehicle and the implement and adapted to pivot in such manner as to permit relative upward and downward movement between the vehicle and the implement while maintaining a controlled or selected orientation between them. A hydraulic actuator capable of extending and retracting is operatively connected between the work vehicle and the implement so as to effect the pivotal motion of said linkage and relative motion between the vehicle and implement. A shock absorber is interposed between the hydraulic actuator and one of the work vehicle and the implement for absorbing shock loadings tending to pass between the vehicle and the implement via said hydraulic actuator when in use. The shock absorber includes an elongated link mounted for pivotal motion at a point between opposing ends thereof. One end portion of the elongated link is connected to an end of the actuator and the other end of the link is in a load transmitting relation to a resilient cushion whereby forces exerted by or on said actuator tend to effect pivotal motion of the elongated link and are transformed into compression forces on the resilient cushion.

BRIEF DESCRIPTION OF DRAWINGS

The advantages of this invention will be apparent upon consideration of the following detailed disclosure of the invention, especially when taken in conjunction with the accompanying drawings wherein:

FIG. 4 shows a rear view of a work vehicle with a product applicator boom implement;

FIG. 5 shows a side view of a work vehicle with a product applicator boom implement;

FIG. 6 shows a top view of a work vehicle with a product applicator boom implement.

DETAILED DESCRIPTION OF THE PREFERRED EMBODIMENT

Embodiments of the invention are described here in terms of a suspended boom sprayer as shown in FIGS. 4–6, but it is recognized that it may also be incorporated in conjunction with other implements such as wind rowers. The drawings illustrate a preferred suspension system connection 10 between a work vehicle 12 and a sprayer boom assembly 14 including pairs of arm assemblies arranged as a parallel arm linkages. Parallel arm linkages include at least two arms that are generally parallel. Typically each arm has a pivotal connection on each end spaced the same distance between each other as on the other arms of the linkage, i.e. the arms are of the same effective length. Two component items can be connected together by the linkage arms to maintain their angular orientation relative to each other while allowing relative movement to each other.

Alternately other linkages may be used having arms of different length, or arms that are not parallel, for connecting two component items to each other. This geometry of arms may be desirable for connection of two items and controlling their angular orientation which changes in a selected manner as the arms are rotated and as the component items are moved relative to each other.

Figure 1:
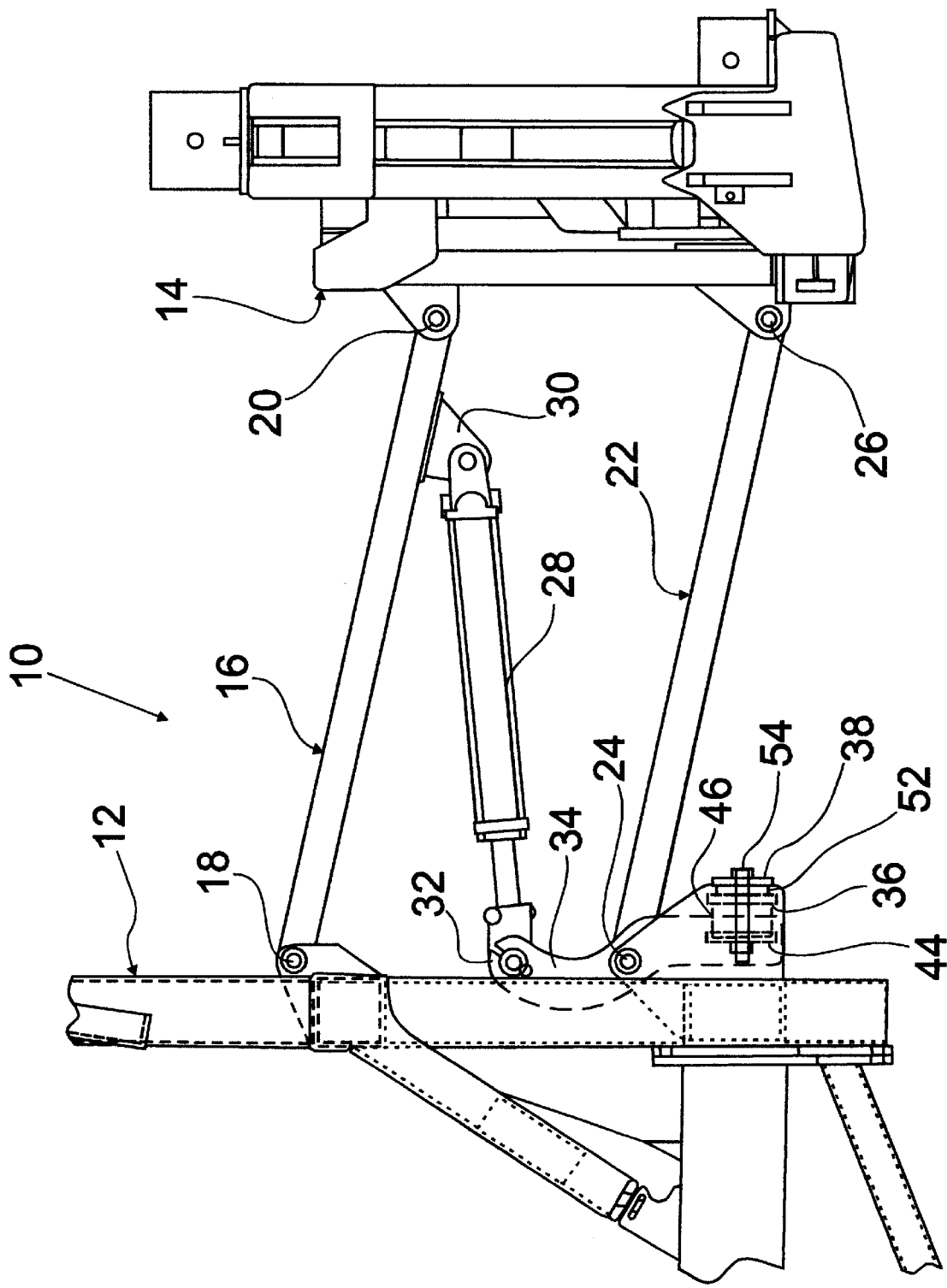
FIG. 1 shows a side view of a suspension system according to the present invention.

In the embodiment shown in FIG. 1 the suspension system 10 includes an upper arm assembly 16 including a horizontally spaced pair of arms pivotally connected to the work vehicle 12 at a pair of generally horizontal joints 18 for pivotal movement in a generally vertical plane about the joints 18. The upper arm assembly 16 is also pivotally connected to the sprayer boom assembly 14 at a pair of generally horizontal joints 20 for pivotal movement in a vertical plane about the joints 20. A lower arm assembly 22 is pivotally connected to the work vehicle 12 at a pair of generally horizontal joints 24 and to the sprayer boom assembly 14 at a pair of generally horizontal joints 26 for pivotal movement in a vertical plane about the pairs of joints 24 and 26. Joints 24 and 26 of the lower arm assembly 22 are spaced from each other a distance equal to that between joints 18 and 20 of the upper arm assembly 16. The joints 24 and 18 at which the arm assemblies 22 and 16 are connected to the work vehicle are also spaced the same distance apart as the joints 26 and 20 at which the arm assemblies are connected to the sprayer boom assembly 14. With this parallel arm linkage suspension connection the sprayer boom assembly angular orientation relative to the work vehicle is maintained constant as the sprayer boom assembly 14 is moved relative to the work vehicle 12.

A pair of hydraulic actuators 28 are pivotally connected at their base ends to tabs 30 fixed on the arms of the upper arm assembly 16, near the ends of the arm assemblies which are connected to the spray boom assembly at joints 20. The rod ends of the actuators 28 are connected at joints 32 to (upper) first ends of respective suspension links 34 forming part of a shock absorbing system to be described below.

Figure 3:
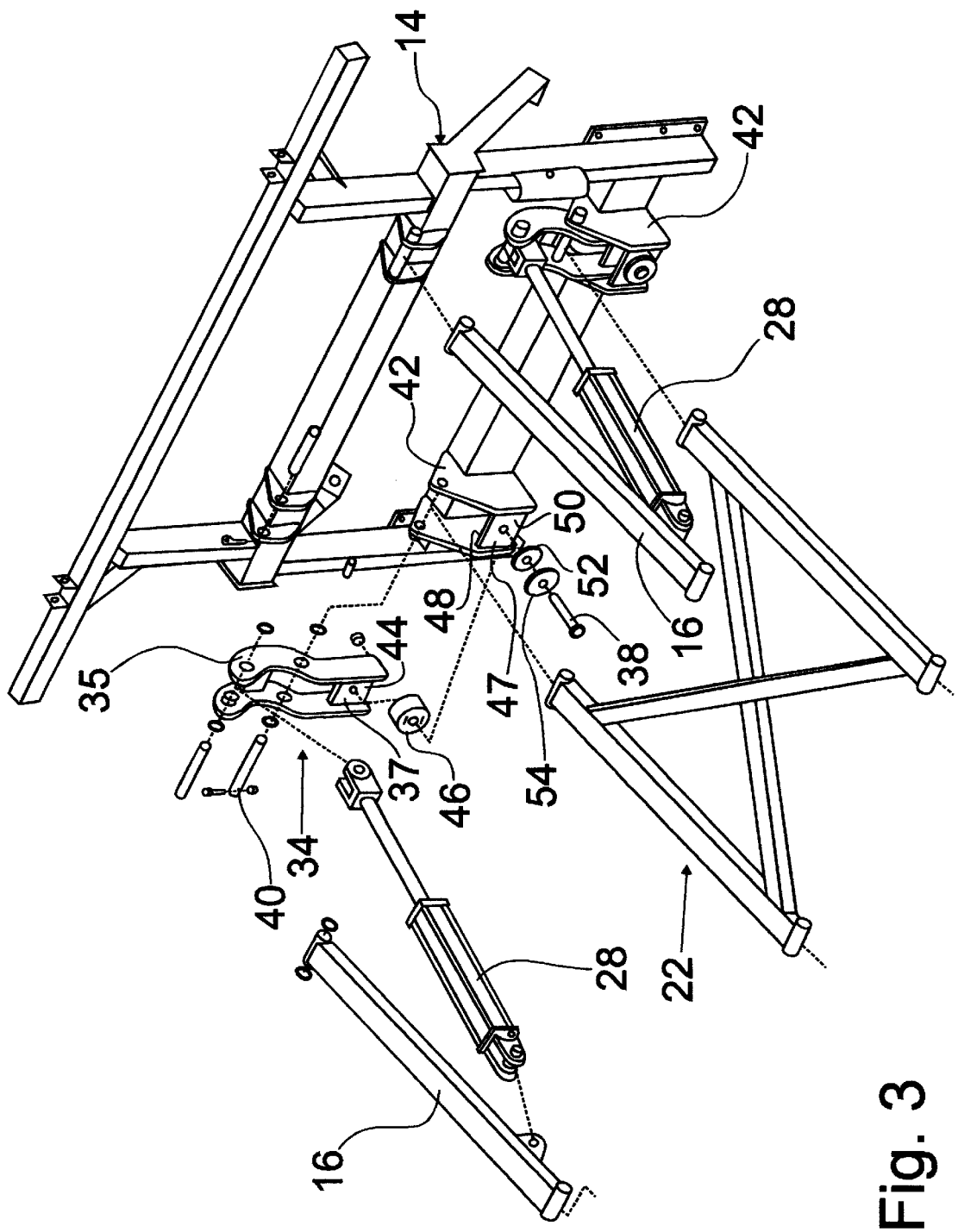
FIG. 3 shows a perspective exploded view of the suspension system shown in FIG. 1.

FIG. 3 shows the suspension links 34 in more detail. Each suspension link 34 has a second (lower) end 36 through which there is a bore for receiving elongated fastener 38. The links 34 are also connected intermediate their first and second ends to the joints 24 at which the lower arm assembly 22 is also connected. This joint comprises a journal at the end of each lower arm, journals through the suspension link 34, and a pin 40 which is held secure in an associated mount bracket 42 fixed to the work vehicle frame. Each suspension link 34 comprises two elongated side plates 35 which straddle the associated arm of the lower arm assembly 22 when the joint is assembled. The second (lower) end of the suspension link 36 includes a tab 37 joining the side plates 35 through which the fastener 38 receiving bore extends. This tab also provides a bearing surface 44 for abutting with a resilient cushion 46. The mounting bracket 42 also has spaced parallel side plates between which is attached a further tab 47 with inner and outer bearing surfaces 48 and 50 respectively. This further tab 47 also has a bore for receiving the fastener 38.

The shock absorber for the suspension system includes the suspension links 34, resilient cushions 46, and second resilient cushions 52. The cushions 46 and 52 and washers 54 each have a central bore through which fasteners 38 extend to retain their co-axial positions. The fasteners 38 each extend through the bore through the bearing surface 44 and through a bore through the surfaces 48 and 50 of the further tab 47 of mount bracket 42. The first resilient cushion 46 is retained in position between the suspension link-bearing surface 44 and the mount bracket inner bearing surface 48. The second resilient cushion 52 is retained in position between the washer 54 and the outer bearing surface 50. The washer is retained by the head of the fastener 38 and the fastener 38 is also secured to the tab 37 of the suspension link 34 by a threaded nut on the side of the tab opposite the bearing surface 44.

As best seen in FIG. 1, when the sprayer boom assembly 14 is decelerated from a downward movement or accelerated upward, due to movement of the work vehicle 12 over uneven ground, then the actuators 28 will resist compressive forces acting on the actuators. These forces will act on the suspension links 34 tending to pivot same about joints 24, with said forces being transformed to compressive forces acting on the resilient 25 cushions 46, each cushion abutting between bearing surfaces 44 and 48. Deceleration from upward movement or acceleration downward may impose tension forces on the actuators 28. These tension forces would be transmitted through the suspension links 34, and through the fasteners 38 to act on the washers 54, imposing compressive forces on the second resilient cushions 52 abutting between outer bearing surfaces 50 and the washers 54.

Shock forces from situations contemplated above are in which the actuators 28 resist movement in at least one of the extending and retracting directions. The shock absorbers also conveniently absorb shock forces that may result if actuators 28 are stopped abruptly when being retracted to lower the sprayer boom assembly 14 relative to the work vehicle 12, in which case the resulting shock forces from the abrupt stop are also absorbed by the resilient cushions 46.

In a preferred embodiment the actuators 28 have been found to need only be single acting hydraulic cylinders resisting compressive forces only. The second resilient cushions 52 minimize shock that may otherwise occur if the actuators are suddenly extended to their limit.

The preferred embodiment has the hydraulic actuators connected at the base end to the upper arms 16 and at the rod end to the suspension links 34 at joints 32. Successful operation of the system is dependent on one end of each actuator being connected to its associated suspension link; however, it is recognized that other embodiments of the suspension system may be constructed. For example, one alternate embodiment may have a second end of each actuator attached to the spray boom assembly at points which provides actuation of the suspension system, whether it be a system having parallel arms or otherwise as discussed above. The actuator may be connected at points at which the actuators must retract to raise the sprayer boom assembly, or at points such that it must extend to raise the sprayer boom assembly. Alternatively, the shock absorbers may otherwise be connected to the sprayer boom assembly and the second ends of the actuators connected to either the upper arms or lower arms of the suspension system, or to the work vehicle. Again each actuator may function while either extending or retracting to raise the sprayer boom assembly, depending on where its second end is connected and where the shock absorber is connected. The shock absorbers can alternatively be connected with the intermediate joints coaxial with joint 18, or at separate locations. The advantages of the invention are gained in the simplicity of the shock absorber design and its connection with the actuators.

The resilient cushion 46 and second resilient cushion 52 are preferably constructed of polyurethane material. They are preferably disc shaped with a central bore. The resilient cushion's diameter and thickness dimensions are dependent on the mass of the sprayer boom assembly 14, or other implement and the degree of shock absorbing effect desired. For various alternate constructions as described above, the proportionate relative size of cushions 46 and 52 may be reversed from what is seen in FIG. 1 or FIG. 3 if the predominant shock forces act on the second resilient cushion 52. The actuator may be single or double acting as required.

Figure 2:
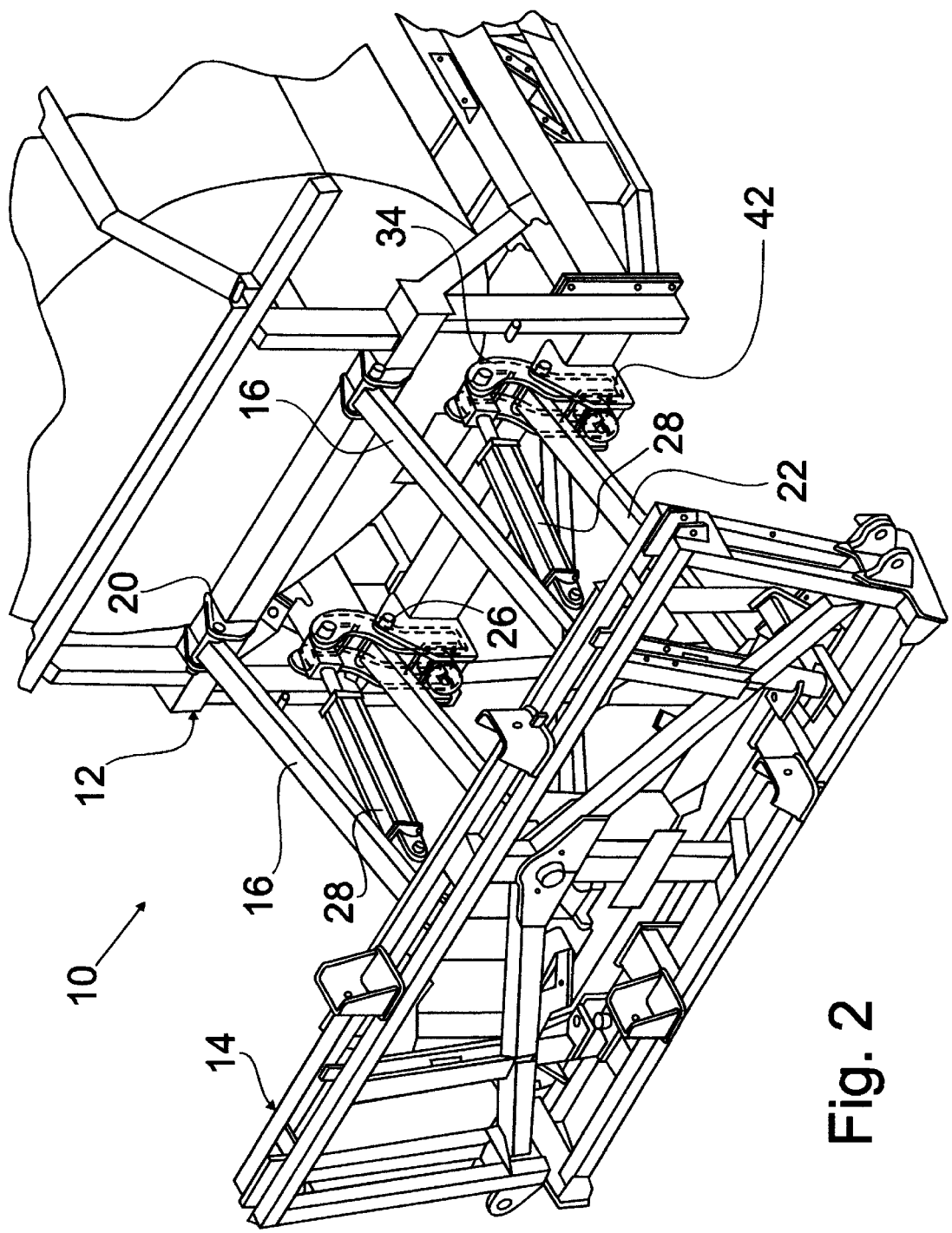
FIG. 2 shows a perspective view of the suspension system shown in FIG. 1.

The suspension system preferably includes two pairs of parallel arms as shown in FIG. 2 and FIG. 3. The lower arms of each pair are preferably connected together by cross members as shown which provide lateral stability of the suspension system so that the implement does not move laterally relative to the work vehicle 14. Alternatively, the upper arms may be connected together. Still further, the suspension system may be constructed of arms that are not contained in the same vertical plane. This can include a suspension system that has two lower arms cross-connected as shown in FIG. 3, but with a single upper arm located above and between the lower arms. One or more actuators may be used in suitable locations as described above with associated shock absorbers connected between the actuator and either the work vehicle or the implement.

Another alternative construction is one in which the hydraulic actuator is connected to and between the upper and lower arms with the connection to one of said arms being via a lever pivotally joined to the arm and having one or more resilient cushions to restrain its pivotal movement relative to the arm, thus serving to absorb shocks tending to pass via the actuator between the work vehicle and the implement. Again, as with the other embodiments described, the hydraulic actuator interacts between the work vehicle and the implement to effect relative motion between them while the shock absorber, interposed between the actuator and either the work vehicle or the implement, serves to absorb shock loadings tending to pass between the vehicle and the implement via said hydraulic actuator.

Preferably the shock absorbers described above include the resilient cushions described above to restrain rotational movement of the suspension link in both the clockwise and counterclockwise directions about its intermediate joint. However, in some situations, restraint of motion may be required in only one direction in which case a single resilient cushion may be used, or the restrained end of the suspension link may be restrained by other means, such as by springs or a unitary cushion that provides restraint in both directions.

As previously indicated, the invention is not limited in application to sprayer boom assemblies but is applicable to boom assemblies that may be used for application of agricultural products other than liquids, such as granules, and to other implements such as wind rower headers.

These and other embodiments of the invention will become apparent to persons skilled in the art without departing from the spirit and scope of the invention defined in the claims attached.

Having thus described the invention, what is claimed is:

1. A suspension system for supporting an implement on a work vehicle, said system comprising:
    a linkage mechanism adapted for pivotal connection between the work vehicle and the implement and adapted to pivot in such manner as to permit relative upward and downward movement between the vehicle and the implement while maintaining a controlled or selected orientation between them;
    a hydraulic actuator capable of extending and retracting and adapted to interact between the work vehicle and the implement when in use so as to effect the pivotal motion of said linkage mechanism and relative motion between the vehicle and implement in at least one direction, said hydraulic actuator being connected at one end to said linkage mechanism; and
    a shock absorber adapted to be interposed between said hydraulic actuator and one of the work vehicle and the implement for absorbing shock loadings tending to pass between the vehicle and the implement via said hydraulic actuator when in use regardless of the degree of extension or retraction of said actuator.

2. The suspension system of claim 1 wherein said shock absorber includes a resilient cushion to absorb the shock loadings tending to be transmitted via said actuator.

3. The suspension system of claim 2 wherein the shock absorber includes an elongated link mounted for pivotal motion at a point between opposing ends thereof, one end portion of said elongated link being connected to an end of said actuator and the other end of said link being in a load transmitting relation to said resilient cushion whereby forces exerted by or on said actuator tend to effect pivotal motion of said elongated link and are transformed into compression forces on said resilient cushion.

4. The suspension system of claim 3 wherein said linkage mechanism comprises upper and lower arm assemblies both of which have joints at their opposing ends to allow for pivotal connection thereof between the work vehicle and the implement.

5. The suspension system of claim 4 wherein said elongated link of the shock absorber is mounted for said pivotal motion at a point which is co-axial with the joints at one end of one of said arm assemblies.

6. The suspension system of claim 5 including mounting brackets securable to one of said implement and work vehicle co-operating with the joints at said one end of said one of said arm assemblies to define a pivot axis therewith co-axial with the pivot axis of said elongated link.

7. The suspension system of claim 6 wherein said mounting brackets further define bearing surfaces with each said resilient cushion being interposed between a respective one of the bearing surfaces and a respective said other end of an associated said elongated link.

8. The suspension system of claim 7 wherein a further resilient cushion is associated with another one of said bearing surfaces and said elongated link such that said shock absorber is capable of absorbing both compressive and tensile shock loadings passing through said hydraulic actuator.

9. The suspension system of claim 7 wherein each said resilient cushion is of a resilient polyurethane material.

10. The suspension system of claim 4 wherein said hydraulic actuator is connected in use between one of said arm assemblies and said one end portion of said elongated link of the shock absorber.

11. The suspension system of claim 10 wherein said upper and lower arm assemblies are of equal length so as to form a parallel arm linkage system, said hydraulic actuator having one end thereof connected adjacent to an end portion of one of said arm assemblies while the other end of said actuator is connected to said one end portion of said elongated link.

12. In combination, an agricultural work vehicle and an implement and a suspension system for supporting said implement on said work vehicle, said combination comprising:
    a linkage mechanism providing a pivotal connection between the work vehicle and the implement and adapted to pivot in such manner as to permit relative upward and downward movement between the vehicle and the implement while maintaining a controlled or selected orientation between them;
    a hydraulic actuator capable of extending and retracting and connected to interact between the work vehicle and the implement when in use so as to effect pivotal motion of said linkage mechanism and relative motion between the vehicle and implement in at least one direction, said hydraulic actuator being connected at one end to said linkage mechanism; and
    a shock absorber interposed between said hydraulic actuator and one of the work vehicle and the implement for absorbing shock loadings tending to pass between the vehicle and the implement via said hydraulic actuator when in use regardless of the degree of extension or retraction of said actuator.

13. The combination of claim 12 wherein said shock absorber includes a resilient cushion to absorb the shock loadings tending to be transmitted via said actuator.

14. The combination of claim 13 wherein the shock absorber includes an elongated link mounted for pivotal motion at a point between opposing ends thereof, one end portion of said elongated link being connected to an end of said actuator and the other end of said link being in a load transmitting relation to said resilient cushion whereby forces exerted by or on said actuator tend to effect pivotal motion of said elongated link and are transformed into compression forces on said resilient cushion.

15. The combination of claim 14 wherein said linkage mechanism comprises upper and lower arm assemblies both of which have joints at their opposing ends providing pivotal connections thereof between the work vehicle and the implement.

16. The combination of claim 15 wherein said elongated link of the shock absorber is mounted for said pivotal motion at a point which is co-axial with the joints at one end of one of said arm assemblies.

17. The combination of claim 16 including mounting brackets secured to one of said implement and work vehicle and co-operating with the joints at said one end of said one of said arm assemblies to define a pivot axis therewith co-axial with the pivot axis of said elongated link.

18. The combination of claim 17 wherein said mounting brackets further define bearing surfaces with each said resilient cushion being interposed between a respective one of the bearing surfaces and a respective said other end of an associated said elongated link.

19. The combination of claim 18 wherein a further resilient cushion is associated with another one of said bearing surfaces and said elongated link such that said shock absorber is capable of absorbing both compressive and tensile shock loadings passing through said hydraulic actuator.

20. The combination of claim 18 wherein each said resilient cushion is of a resilient polyurethane material.

21. The combination of claim 15 wherein said hydraulic actuator is connected between one of said arm assemblies and said one end portion of said elongated link of the shock absorber.

22. The combination of claim 21 wherein said upper and lower arm assemblies are of equal length so as to form a parallel arm linkage system, said hydraulic actuator having one end thereof connected adjacent to an end portion of one of said arm assemblies while the other end of said actuator is connected to said one end portion of said elongated link.

* * * * *